Aug. 15, 1961  R. W. LA WARRE ET AL  2,996,133
POWER ATTACHMENT FOR APPLIANCE TRUCKS
Filed April 7, 1960  3 Sheets-Sheet 1
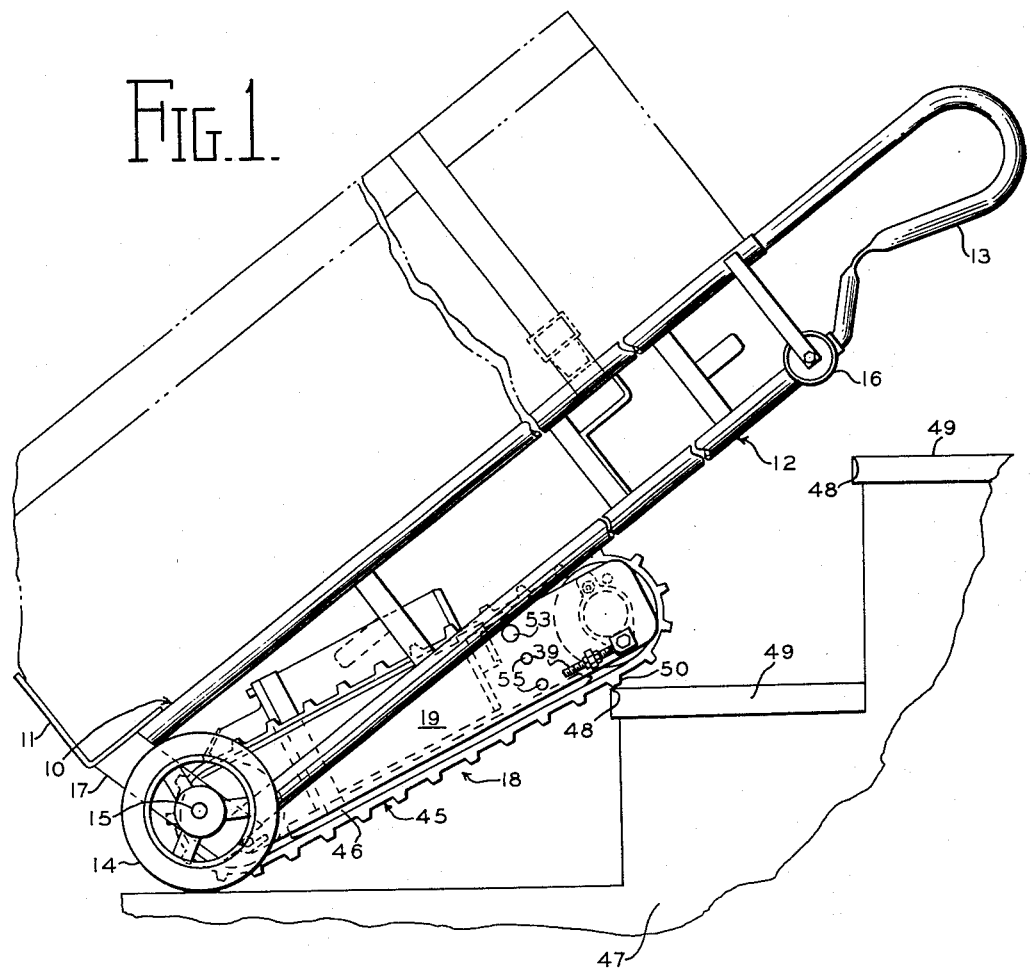
INVENTOR.
ROBERT W. LaWARRE &
DARREL A. CHAPMAN
BY
Owen & Owen

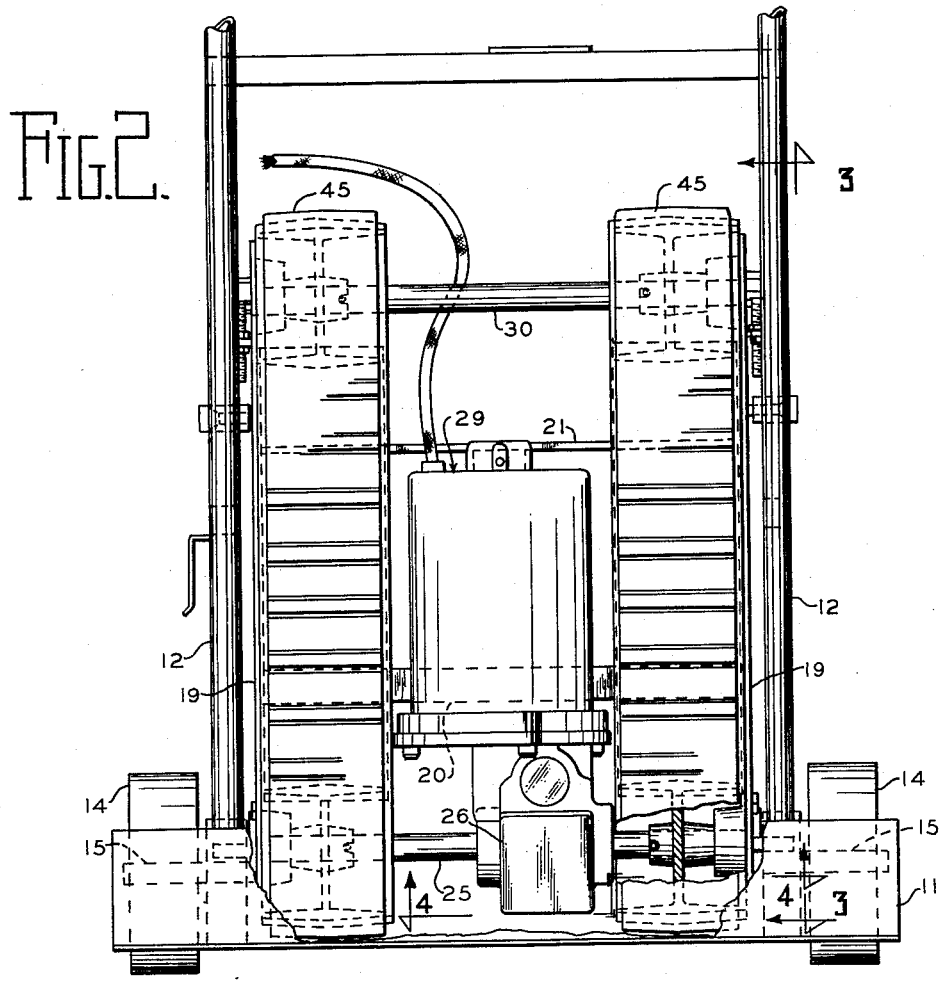
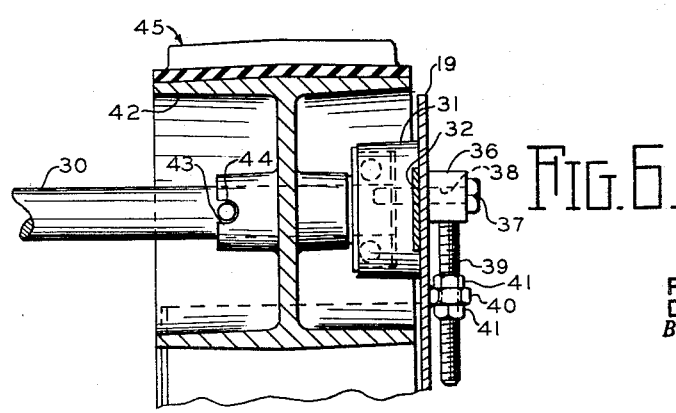

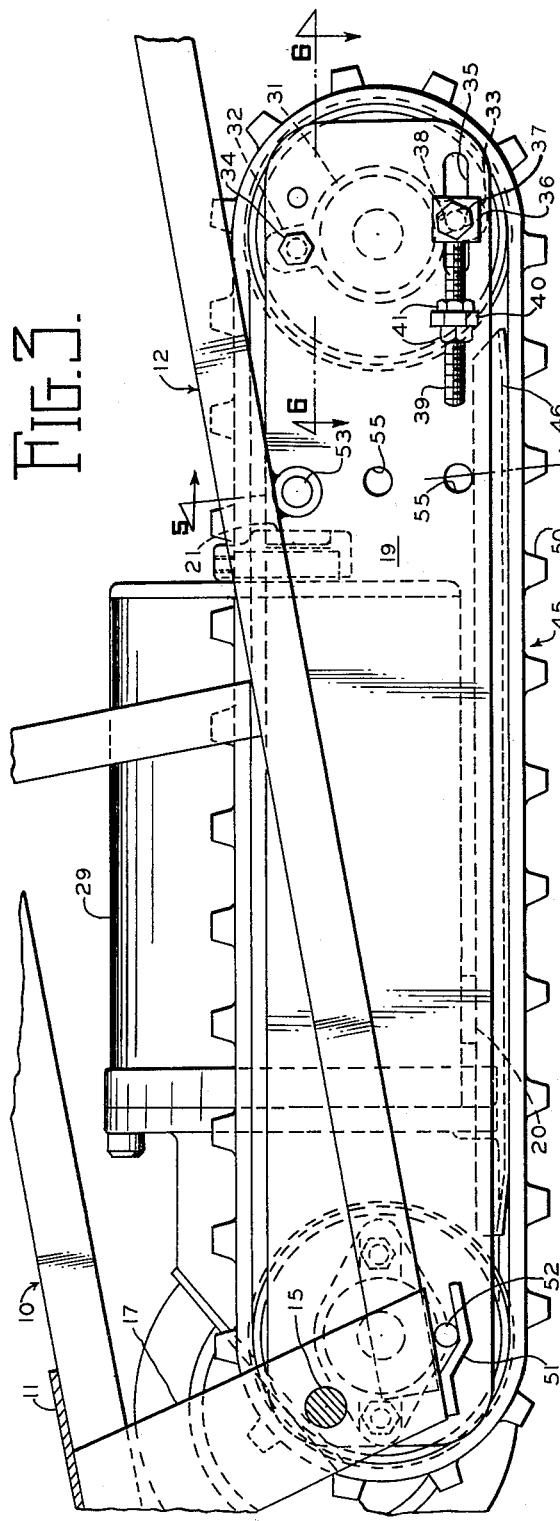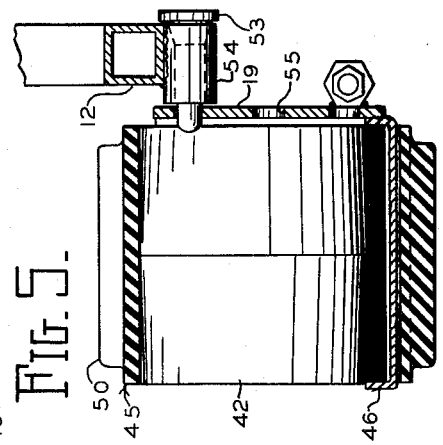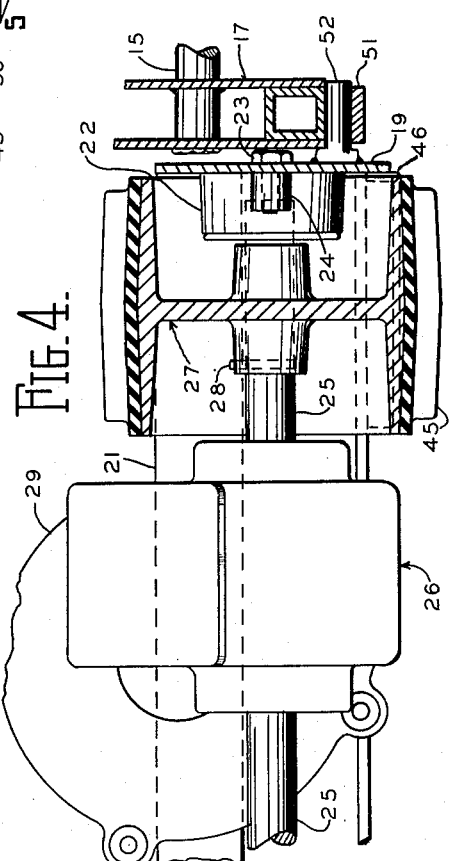

2,996,133
Patented Aug. 15, 1961

2,996,133
POWER ATTACHMENT FOR APPLIANCE TRUCKS
Robert W. La Warre, Lima, and Darrel A. Chapman, Cridersville, Ohio, assignors to New Design and Development Corporation, Lima, Ohio, a corporation of Ohio
Filed Apr. 7, 1960, Ser. No. 20,668
4 Claims. (Cl. 180—9.22)

This invention relates to a power attachment for appliance trucks of the type used for transporting of heavy appliances such as refrigerators, freezers, ranges, etc., and more particularly to the construction of a power driven stair climbing attachment which incorporates not only endless traction means by which the appliance truck can be used to traverse up and down flights of stairs with only a single operator acting to guide the mechanism, but also quick release means by which the attachment can be easily removed from the truck.

An appliance is usually moved by means of a hand truck to which the appliance is strapped, and one man can normally move even a quite heavy appliance by means of such a truck across a level surface. However, when the appliance must be moved from one level to another along a flight of stairs or a ramp, at least two, and sometimes three, movers are required because the appliance is being lifted. This problem is even more difficult when the appliance is moved up or down a flight of stairs because the hand truck will not roll up or down stairs. Thus additional manpower is required during the time which the appliance is being moved from one level to another, and when the appliance is at the desired level it can be readily moved by one man with the hand truck thereby making the additional manpower unnecessary.

In an attempt to solve this problem, various types of self-propelled appliance trucks have been proposed, and while such trucks would move the appliance from one level to another the propelling mechanism was not utilized when the truck was being used to move the appliance across a relatively flat surface. Thus the propelling mechanism merely added to the weight of the truck, and consequently increased the load that the operator had to push when the truck was being used on such a surface.

The self-propelled appliance trucks were only used for a portion of their total operating time in transporting appliances from one level to another, and inasmuch as the power driven mechanism constituted a major portion of the total cost of such a truck, the most expensive portion of the truck was only used for a fractional part of the time that the truck was in operation. Also, when several men were moving a number of appliances from one location to another located on separate levels, each truck had to be equipped with the self-propelling mechanism to eliminate the time-wasting and costly operation of transferring appliances from one truck to another between locations.

The self-propelled trucks utilized by appliance movers customarily had a pair of power driven tracks extending along each side of the lower surface of the truck. These tracks were carried by drums and the span of the track between these drums was either unsupported or was supported by a means of bogey rollers. Such an arrangement proved to be somewhat unsatisfactory because the track only engaged the leading edge of the stair treads and movement up or down a flight of stairs was similar to driving the mechanism across a saw tooth surface instead of a flat surface. Thus the portion of the track in contact with the leading edge of the stair tread was either supported by a bogey roller on the opposite side of the track or was appreciably deformed between the bogey rollers by the stair tread. The amount of deformation of the track was determined by the spacing between the bogey rollers, and in the case of unsupported tracks this deformation was considerable. This track deformation not only increased the angle from horizontal that the appliance had to be lifted thereby increasing the power required, but also the resulting bounce often caused damage to the appliance and made the truck difficult to guide. Attempts to support the entire space between the drums by the use of runners in constant contact with the tracks resulted in high power requirements because of friction losses.

The self-propelled trucks of the prior art customarily utilized freely rotatable drums at the opposite end of the track from the power source, and while such an arrangement was satisfactory while the tracks both contacted the stair tread with equal pressure, certain problems arose when it became necessary to tilt the load on the stairway during movement around corners. Tilting of the appliance resulted in excessive pressure on one track and greatly increased friction against the track back up means. Because the track was driven only by its power drum, slippage of the track on this drum, oftentimes resulted.

It is the object of the invention to provide a power attachment having a quick release mechanism by which the power attachment can be attached to and removed from a conventional appliance truck when desired to permit a single attachment to be used with several trucks.

It is also the object of the invention to provide a power driven stair climbing attachment adapted to be removably connected to an appliance truck providing power by which the truck can be moved up and down relatively steep flights of stairs, thus eliminating the necessity for delivery men to actually lift the heavy appliances customarily moved on appliance trucks, and providing for the movement of such appliances by only one operator.

A further object of the invention is to provide a power driven stair climbing attachment for an appliance truck which provides a rigid support for the track along the entire portion in contact with the treads of the stairs.

Still another object of the invention is to provide a power attachment for an appliance truck in which the idler drums are locked together thereby providing means for driving both of the idler drums through both of the tracks when the appliance is tilted and frictional resistance to movement of one of the tracks is increased.

Other and more specific objects and advantages of the invention will be better understood from the following specification and from the drawings, in which:

FIG. 1 is a view in elevation of a standard type of appliance truck mounted upon a power attachment embodying the invention;

FIG. 2 is a fragmentary plan view showing the appliance truck mounted upon the power attachment, with parts broken away;

FIG. 3 is a fragmentary enlarged view in side elevation, taken along the line 3—3 of FIG. 2;

FIG. 4 is a fragmentary sectional view taken along the line 4—4 of FIG. 2 and shown on an enlarged scale;

FIG. 5 is a fragmentary sectional view taken along the line 5—5 of FIG. 3; and

FIG. 6 is a fragmentary horizontal sectional view taken along the line 6—6 of FIG. 3.

An appliance truck of the type with which a power driven attachment embodying the invention is designed to be employed comprises a flat bed, generally indicated at 10, an end plate 11, a pair of spaced side frames 12, and a pair of handles 13 (see FIG. 1). Two large support wheels 14 are freely rotatably journaled on stub axles 15 carried by the side frames 12, and a pair of small rollers 16 are mounted in the side frames 12 near the handles 13. An appliance, for example an upright refrigerator indicated in dotted lines in FIG. 1, is mounted upon the bed 10 of the appliance truck by one or more tie straps which extend circumjacently around the appliance and parts of the side frames 12 of the truck. The end plate 11 prevents the appliance from sliding off the bed 10.

The side frames 12 of the appliance truck include wheel struts 17 which are welded or otherwise secured at the junctions of the side frames 12 and the end plate 11 and extend downwardly forming structural portions of the side frames 12 and in which the stub axles 15 are rigidly secured, as by welding (see FIGS. 3 and 4).

A power attachment embodying the invention is generally indicated at 18 and has a main frame including a pair of elongated vertical plate members 19 which extend parallel to each other. The two side plates 19 are rigidly connected to each other in spaced relationship by a cross frame 20 and a cross brace 21.

At the front end of each of the side plates 19 and on their respective inner sides, there is mounted an axle journal 22 (see FIG. 4) rigidly held in place by a pair of machine screws 23 which extend through suitable holes in the plate 19 and are threaded into bosses 24 on the sides of the journals 22. The two journals 22 rotatably mount a drive shaft 25 which extends horizontally across the front of the attachment 18 and through a reduction drive box generally indicated at 26. A flanged drive drum 27 is mounted on each end of the drive shaft 25 just inside of the journal 22, and the drum is rotated by the shaft 25 through a connecting pin 28 which extends into a slotted portion in the hub of the drum. The reduction drive box 26 preferably comprises a worm and gear drive, thereby providing both for power and braking action when an appliance is being moved up or down a steep incline or flight of stairs.

A drive motor 29 is bolted to the gear box 26 with its drive shaft extending thereinto, and the opposite end of the motor housing 29 is rigidly secured to the cross brace 21 both for rigidity and to prevent reactive torsion of the frame of the motor 29 when the attachment is being driven.

The drive motor 29 is equipped with a suitable power supply line which leads to a switch adapted to be hooked on one of the handles 13 during use and thence to a plug which can be inserted in any power outlet at the location where the appliance is being moved.

An idler shaft 30 (FIGS. 2 and 6) is rotatably mounted in a pair of journals 31 which are adjustably carried at the rear end of each of the side plates 19. Each of the journals 31 has two ears 32 and 33 (FIG. 3) and is secured to its respective side plate 19 by a machine screw 34 extending through a hole in the side plate 19 and threaded into the upper ear 32. The lower ear 33 is horizontally aligned with a slot 35 in its respective side plate 19, and a thrust block 36 is located on the outer side of the side plate 19. The journal alignment is maintained by a bolt and nut assembly 37 which extends through the block 36, a slot 38 in the ear 33 and the slot 35 in the side plate 19.

A threaded adjustment rod 39 is welded or otherwise attached to the block 36 and extends through an opening in an ear 40 welded to the outer side of the plate 19. The rod 39 is moved longitudinally by means of a pair of adjustment nuts 41 threaded onto the rod 39 on opposite sides of the ear 40. By rotating the nuts 41, the adjustment rod 39 is moved longitudinally relative to the ear 40 and swings its respective one of the journals 31 on its support bolt 34 to move the idler shaft 30 closer to or farther away from the drive shaft 25.

A flanged idler drum 42 (FIG. 6) is mounted upon each end of the idler shaft 30 immediately adjacent one of the journals 31. Each of the idler drums 42 has a slot 43 formed in its hub, and a locking pin 44 extending through a suitable aperture in the idler shaft 30 immediately adjacent this slotted portion engages the slot 43 to transmit rotational movement from the shaft 30 to the drum 42.

Each of the pairs of drive drums 27 and idler drums 42 carried by one of the side plates 19 supports and drives one of a pair of endless deformable traction belts 45 which extends around the outer peripheries of its respective drums 27 and 42. The outer diameters of the drums 27 and 42 are large enough so that the upper and lower spans of the undeformed traction belts 45 extend at a level above and beneath, respectively, the upper and lower edges of the side plates 19, and the upper and lower spans of each undeformed belt are substantially parallel. Likewise the lower span of each undeformed belt lies in the same plane as the lower span of the other belt.

An important feature of the invention is the elongated belt supporting member in the form of a pressure plate 46 which is rigidly secured to and extends inwardly from the lowermost edge of the side member 19 (see FIG. 5). While each pressure plate 46 spans substantially the entire open span between a drive drum 27 and an idler drum 42 (see FIG. 3) the lower span of the undeformed belt 45 is not only substantially parallel to, but also spaced slightly from the pressure plate 46. Thus the pressure plate 46 which is in substantial juxtaposition with the lower span of the belt 45, is actually maintained out of contact with this belt in its undeformed condition and power loss caused by friction between the belt 45 and the plate 46 is minimized.

However, when the power attachment 18 moves the appliance truck to a stair 47 (see FIG. 1), a portion of the lower span of each belt 45 contacts the leading edge 48 of each stair tread 49 and slippage is prevented by tread engaging cross lugs 50 on the belt 45. Thus as the lower span of the belt 45 is deformed by the leading edge 48, it is moved into engagement with the pressure plate 46, and the substantially flat surface of this plate engages and supports only that portion of the belt 45 which contacts the leading edge 48 of the tread 49.

Normally while the attachment 18 is moving the truck along a flight of stairs both belts 45 contact the leading edges 48 of the treads 49 with substantially equal pressure. Consequently the pressures on the pressure plates 46 are likewise approximately equal. However, if it becomes necessary to tilt the load on the truck to move the appliance around a corner a much greater pressure is exerted on the belt which remains in contact with the tread 49. Slippage between the drive drum 27 and the belt 45 because of the greater frictional force between the pressure plate 46 and the belt 45 is prevented by driving the idler drum 42 on the side in contact with the tread with the idler drum 42 in the opposite side through the idler shaft 30 and the locking pin 43. The idler drum 42 on the opposite side is driven by the belt 45 which is out of engagement with the tread 49 and the drive drum 27 on this same side.

A power attachment embodying the invention is adapted for quick connection and removal from an appliance truck by means of cooperating elements added to the side frames 12 of the appliance cart and the side plates 19 of the power attachment. These means include a pair of bent hooks 51 (FIGS. 3 and 4) which are welded to the lower ends of the wheel support struts 17 and a pair of outwardly protruding horizontal trunnions 52 which are welded to the outer sides of the plates 19 beneath the location of the journals 22. The bent hooks 51 are moved into and out of trunnion receiving position by moving the truck relative to the attachment 18 thereby engaging and disengaging the trunnions 52.

The rear end of the power attachment 18 is adjustably connected to the side frames 12 of the appliance cart by a pair of spring loaded shot pins 53 (FIG. 5) slidably mounted in sleeves 54 welded to the under side of the side frames 12. The pins 53 may be engaged with any of a plurality of holes 55 drilled through the side plates 19 along an arc centered on the position of the trunnions 52 in the bent hooks 51. By inserting the pins 53 in the same ones of the holes 55 in the two side plates 19, the angular relation between the appliance cart and the power attachment 18 may be varied from that shown in the drawings to a lesser angle when the pins 53 are inserted into lower ones of the holes 55. This angular relationship which changes position of the center of gravity of the load relative to the power attachment may necessarily be varied depending upon whether the power attachment is being used for moving an appliance and an appliance truck along a horizontal floor, up or down an incline or stairway of low pitch, or up and down a steep incline or stairway. Insertion of the pins 53 in the holes 55 likewise prevents the trunnion 52 from moving out of engagement with the hooks 51.

By reason of the quick attaching and detaching means, an operator may wheel an appliance across a horizontal floor on the appliance truck and not attach the power attachment to the truck until just prior to climbing or descending a runway, ramp or stairway. By reason of the quick attachment and detachment, only a few power attachments may be utilized in connection with a larger number of appliance carts in locations such as warehouses and appliance stores. After separation of the power driven attachment from the appliance truck the truck is returned to its normal condition and may be used in the normal way. With the appliance truck mounted on the power attachment embodying the invention, the entire appliance truck and appliance mounted thereon is supported thereon and the power attachment propels the entire load along a floor or up or down an incline or stairway, as is necessary.

We claim:

1. A power driven stair climbing attachment for an appliance truck, comprising a pair of spaced elongated substantially parallel side members, a pressure plate secured to each of said side members along the lowermost edge thereof, an endless belt mounted on each of said side members with its lower span spaced slightly from said pressure plate whereby only that portion of the belt in contact with the stair is engaged by said pressure plate, a pair of drive drums rotatably journaled at corresponding ends of said side frames substantially co-axially with each other for driving engagement with said belts, a drive motor mounted between said side members, drive connection means between said motor and said drive drums, idler drums engaging said belts at the opposite ends of said side members from said drive drums, an idler shaft for carrying said idler drums at opposed ends thereof, and means for rigidly securing said idler drums to said idler shaft whereby each idler drum is driven by the opposed idler drum as one of said belts is deformed by said stairway into contact with one of said pressure plates.

2. A power attachment for an appliance truck comprising a main frame including a pair of spaced substantially parallel side members, journals mounted on each of said side members adjacent each end thereof, a drive shaft rotatably mounted in a first pair of said journals at corresponding ends of said side members, a drive drum mounted on each end of said drive shaft, a reduction gear box comprising a worm and gear drive for providing both power and braking action through said drive shaft, a drive motor secured to said gear box for supplying power thereto, said drive motor having its drive shaft extending into said gear box and its opposite end rigidly secured to said main frame, an idler shaft rotatably mounted in a second pair of said journals, said second pair of journals being adjustably secured to said side plates to permit adjustment between said idler shaft and said drive shaft, an idler drum mounted on each end of said idler shaft immediately adjacent said second pair of journals, each of said idler drums having a hub with a slot formed therein, a locking pin extending through a suitable aperture in said idler shaft into said slot whereby movement of one drum drives the other drum on said idler shaft, a pair of endless traction belts carried by said drive drums and said idler drums, a pressure plate carried along the lowermost edge of each of said side members, and means for removably connecting said attachment to said truck.

3. A power driven stair climbing attachment for an appliance truck having spaced side frames, comprising a main frame including a pair of spaced substantially parallel side members rigidly connected by a pair of cross members, journals mounted on each of said side members adjacent each end thereof, a drive shaft rotatably mounted in a first pair of said journals at corresponding ends of said side members, a pair of drive drums mounted on said drive shaft, a reduction gear box comprising a worm and gear drive for providing both power and braking action through said drive shaft, a drive motor secured to said gear box for supplying power thereto, said drive motor having its drive shaft extending into said gear box and its opposite end rigidly secured to one of said cross members, an idler shaft rotatably mounted in a second pair of said journals, said second pair of journals being adjustably secured to said side plates to permit adjustment between said idler shaft, said drive shaft, an idler drum mounted on each end of said idler shaft immediately adjacent said second pair of journals, each of said idler drums having a hub with a slot formed therein, a locking pin extending through a suitable aperture in said idler shaft into said slot whereby movement of one drum drives the other drum on said idler shaft, a pair of endless traction belts carried by said drive drums and said idler drums, said belts having their lower spans in a plane lower than the lowermost edge of said side members, a pressure plate carried along the lowermost edge of each of said side members, and quick release means for removably connecting said attachment to said truck, said quick release means including means for selectively altering the angle between said side frames and said side members.

4. A power driven stair climbing attachment for appliance trucks, comprising a main frame including spaced side members having journals mounted thereon adjacent each end thereof, a drive shaft rotatably mounted in the journals at one end of said frame, a reduction gear box comprising a worm and gear drive for providing both power and braking action through said drive shaft mounted on said frame, a drive motor operatively connected to said gear box for supplying power thereto, a drive drum mounted on each end of said drive shaft, an idler shaft rotatably mounted in the journals at the opposite end of said frame, said idler shaft having a pair of oppositely disposed apertures formed therein, an idler drum having a slotted portion mounted on each end of said idler shaft with the slotted portion immediately adjacent said apertures, a locking pin extending through each of said apertures into said slotted portion whereby rotational movement of one idler drum drives the other idler drum through said idler shaft, an endless deformable traction belt carried by each of said drive drums and said idler drums forming an upper span and a lower span therebetween, said upper span and said lower span being substantially parallel when said belt is undeformed, an elongated supporting member carried by each of said members along the lowermost edge thereof, said supporting member having a substantially flat surface spanning the open space between one of said drive drums and one of said idler drums above said lower span and spaced therefrom whereby said surface is maintained out of contact with said undeformed belt, and quick release means for selectively connecting said frame to said truck.

References Cited in the file of this patent

UNITED STATES PATENTS

| | | |
|---|---|---|
| 2,650,834 | Coval | Sept. 1, 1953 |
| 2,770,310 | Gates | Nov. 13, 1956 |
| 2,844,413 | Gates | July 22, 1958 |
| 2,856,015 | Stefan | Oct. 14, 1958 |